US012453990B2

(12) United States Patent
DeChard

(10) Patent No.: US 12,453,990 B2
(45) Date of Patent: Oct. 28, 2025

(54) GROW TABLE CLEANING SYSTEM

(71) Applicant: Albert DeChard, Tampa, FL (US)

(72) Inventor: Albert DeChard, Tampa, FL (US)

( * ) Notice: Subject to any disclaimer, the term of this patent is extended or adjusted under 35 U.S.C. 154(b) by 407 days.

(21) Appl. No.: 18/305,731

(22) Filed: Apr. 24, 2023

(65) Prior Publication Data

US 2023/0256482 A1    Aug. 17, 2023

Related U.S. Application Data

(63) Continuation-in-part of application No. 17/505,660, filed on Oct. 20, 2021, now Pat. No. 11,661,367,
(Continued)

(51) Int. Cl.
*B08B 3/14* (2006.01)
*A61L 2/10* (2006.01)
(Continued)

(52) U.S. Cl.
CPC ...... *B08B 3/14* (2013.01); *A61L 2/10* (2013.01); *A61L 2/202* (2013.01); *B01D 71/261* (2022.08);
(Continued)

(58) Field of Classification Search
CPC ....... B08B 3/14; B08B 3/02; B08B 2203/005; B08B 2203/0264; B08B 2203/027; B08B 17/025; A61L 2/10; A61L 2/202; A61L 2/183; A61L 2/22; A61L 2202/17; B01D 71/261; B01D 39/16; B01D 61/025; B01D 2239/065; B01D 2221/12; B01D 2221/14; B01D 21/0012; B01D 21/003; B01D 21/02; C02F 9/00; C02F 1/004; C02F 1/32; C02F 1/40; C02F 1/44; C02F 1/50; C02F 1/78;
(Continued)

(56) References Cited

U.S. PATENT DOCUMENTS 1,764,756 A    6/1930    Slee
3,555,224 A    1/1971    Frind
(Continued)

FOREIGN PATENT DOCUMENTS

GB    2483690 A    3/2012

OTHER PUBLICATIONS

Definition of "whereas" (Year: None).*

*Primary Examiner* — Liam Royce
(74) *Attorney, Agent, or Firm* — Larson & Larson; Frank Liebenow

(57) ABSTRACT

A cleaning system includes a planar material beneath a soiled grow table. The planar material is non-porous except for a drain. Above the planar material is a plate layer including at least two layers of runners arranged in a grid where each successive layer is offset at an angle with respect to the grid of a previous layer. The plate layer rests upon the non-porous material. An upper layer covers the plate layer and has a plurality of holes. A roller table is provided for slideably supporting the grow table. Nozzles are positioned over the grow table and is/are interfaced to a pump for receiving and spraying liquid from the pump downwardly towards the grow table. The liquid and impurities (e.g., soil, leaves) fall to the upper layer and through the plurality of holes for cleaning and filtering the liquid before the liquid is returned to the pump.

16 Claims, 15 Drawing Sheets

Related U.S. Application Data which is a continuation-in-part of application No. 16/832,252, filed on Mar. 27, 2020, now Pat. No. 11,179,753, which is a continuation-in-part of application No. 16/205,462, filed on Nov. 30, 2018, now Pat. No. 10,640,398, which is a continuation-in-part of application No. 15/454,575, filed on Mar. 9, 2017, now Pat. No. 10,174,493, which is a continuation-in-part of application No. 14/615,711, filed on Feb. 6, 2015, now Pat. No. 9,630,860.

(51) Int. Cl.

| | | |
|---|---|---|
| *A61L 2/20* | (2006.01) | |
| *B01D 71/26* | (2006.01) | |
| *B08B 3/02* | (2006.01) | |
| *C02F 1/00* | (2023.01) | |
| *C02F 1/32* | (2023.01) | |
| *C02F 1/40* | (2023.01) | |
| *C02F 1/44* | (2023.01) | |
| *C02F 1/50* | (2023.01) | |
| *C02F 9/00* | (2023.01) | |
| *C02F 101/32* | (2006.01) | |
| *C02F 103/44* | (2006.01) | |

(52) U.S. Cl.
CPC ............... *B08B 3/02* (2013.01); *C02F 9/00* (2013.01); *A61L 2202/17* (2013.01); *B08B 2203/005* (2013.01); *B08B 2203/0264* (2013.01); *B08B 2203/027* (2013.01); *C02F 1/004* (2013.01); *C02F 2001/007* (2013.01); *C02F 1/32* (2013.01); *C02F 1/40* (2013.01); *C02F 1/44* (2013.01); *C02F 1/50* (2013.01); *C02F 2101/32* (2013.01); *C02F 2103/44* (2013.01); *C02F 2303/04* (2013.01)

(58) Field of Classification Search
CPC .... C02F 1/441; C02F 1/283; C02F 2201/007; C02F 2101/32; C02F 2103/44; C02F 2103/26; C02F 2303/04; C02F 2303/16; C02F 2201/005; C02F 2209/42; C02F 2301/046; B60S 3/04; B60S 3/044; A01G 25/00; A01G 7/06

See application file for complete search history.

(56) References Cited

U.S. PATENT DOCUMENTS

| | | | |
|---|---|---|---|
| 3,971,338 A * | 7/1976 | Alexson | ................ A01K 63/04 |
| | | | 119/262 |
| 4,156,621 A | 5/1979 | Andrews | |
| 4,240,944 A | 12/1980 | Temple | |
| 4,815,892 A | 3/1989 | Martin | |
| 5,221,570 A | 6/1993 | Gokcen et al. | |
| 5,411,665 A | 5/1995 | Scraggs et al. | |
| 5,601,906 A | 2/1997 | Henry | |
| 5,738,139 A | 4/1998 | DeChard | |
| 5,976,225 A | 11/1999 | Nystrom | |
| 6,361,695 B1 * | 3/2002 | Husain | ................ B01D 61/145 |
| | | | 210/639 |
| 7,290,558 B2 | 11/2007 | DeChard et al. | |
| 7,530,362 B2 * | 5/2009 | McCormick | ............. E03F 1/00 |
| | | | 134/123 |
| 8,109,696 B2 | 2/2012 | Maggioni | |
| 10,315,199 B2 * | 6/2019 | Rose | ...................... B05B 13/04 |
| 2005/0025582 A1 | 2/2005 | Ianniello | |
| 2007/0044839 A1 | 3/2007 | DeChard | |
| 2010/0155328 A1 | 6/2010 | O'Regam, Jr. | |
| 2012/0063854 A1 | 3/2012 | Ayers | |
| 2016/0289109 A1 | 10/2016 | Ghalib | |
| 2017/0066023 A1 * | 3/2017 | Stolze | ................... A46B 13/02 |
| 2022/0033292 A1 | 2/2022 | DeChard | |

* cited by examiner

GROW TABLE CLEANING SYSTEM

CROSS-REFERENCE TO RELATED APPLICATION

This application is a continuation in part of U.S. patent application Ser. No. 17/505,660 filed Oct. 20, 2021, now U.S. Pat. No. 11,661,367 issued May 30, 2023; which is a continuation in part of U.S. patent application Ser. No. 16/832,252, filed Mar. 27, 2020 now U.S. Pat. No. 11,179,753 issued Nov. 23, 2021; which is a continuation in part of U.S. patent application Ser. No. 16/205,462, filed Nov. 30, 2018, now U.S. patent Ser. No. 10/640,398 issued May 4, 2020; which is a continuation in part of U.S. patent application Ser. No. 15/454,575, filed Mar. 9, 2017, now U.S. Pat. No. 10,174,493 issued Jan. 8, 2019; which, in turn, is a continuation in part of U.S. patent application Ser. No. 14/615,711, filed Feb. 6, 2015, now U.S. Pat. No. 9,630,860 issued Apr. 25, 2017, the disclosure of which are hereby incorporated by reference.

BACKGROUND OF THE INVENTION

Hazardous liquid and wastewater collection is known in the prior art. Due to rising concerns that the environment is becoming polluted at an alarming rate and the mandate of the federal Clean Water Act by, governments, both State and Federal, and those in other countries have begun mandating that water runoff from many vehicle washing procedures be contained and collected for proper disposable to avoid further contamination of the environment. For example, the simple process of cleaning a piece of machinery in which oils are separated from the machinery and the oils mix with the cleaning water, the cleaning water must now be filtered in many locales. Another example is when a facility for growing plants such as medical marijuana uses water to clean the grow area and tables before a new crop is planted, the water used to clean cannot be disposed in the municipal wastewater system. Such wastewater is generally not permitted to simply enter the sewer system or runoff into the underground aquifer or nearest body of water. In many locations, the washing of vehicles such as trucks and automobiles requires that the rinse water be captured, contained and disposed of properly.

Other cleaning problems occur with hazardous liquid and wastewater containment and collection. In particular, it is possible for businesses, public facilities and land areas to be exposed to or infected with deadly biological or chemical substances that are extremely hazardous to remove. During an exemplary cleaning procedure, the people involved must wear protective suits. When finished in the cleaning operation, the protective wear must be thoroughly cleansed before being removed. However, it is not permitted to allow the rinse water to simply run off and into ground or sewer.

In one particular plan-based activity of the past, indoor growing of certain medicinal plants or any type of plant, water and nutrients provided to these plants often reaches the floor of the growing facility. As the water that reaches the floor often contains soil particles, fertilizers, and possible contamination from the plants that are being grown, such facilities are not permitted to allow this contaminated water to flow into drain/storm systems or to reach ground water tables. Further, second to electricity, water for such plants is an expensive portion of the costs of growing such plants. Therefore, there is a need to capture such runoff water and contaminates and to clean the runoff water for use in watering these plants.

U.S. Pat. No. 7,290,558 to DeChard et al, which is hereby incorporated by reference, shows a mobile waste and containment system that lacks multiple layers of corrugated membranes as will be described.

What is needed is a system that will collect contaminated liquids (e.g., water and other soluble or insoluble material) and separate the undesirable materials from the liquid (e.g., water) for proper disposal, permitting reuse of the water to clean plant grow areas and to water plants.

SUMMARY OF THE INVENTION

In one embodiment, a cleaning system is disclosed including a planar material beneath a grow table that is to be cleaned. The planar material being a non-porous material except for a drain and above the planar material is a plate layer comprising at least two layers of runners arranged in a grid, the grid of each successive layer of the at least two layers is offset at an angle with respect to the grid of a previous layer of the at least two layers. The plate layer rests upon the non-porous material. An upper layer covers the plate layer and has a plurality of holes. A roller table is provided within the cleaning system for slideably supporting a grow table. One or more nozzles are positioned over the grow table. Each nozzle is interfaced to a pump for receiving and spraying a liquid from the pump downwardly towards the grow table when the grow table is within the cleaning system. The liquid and impurities (e.g., soil, leaves) fall to the upper layer and through the plurality of holes for cleaning and filtering the liquid before the liquid is returned to the pump.

In another embodiment, a method of cleaning a grow table is disclosed including transporting the grow table into a cleaning system. Within the cleaning system, the grow table is sprayed with a liquid and runoff of the liquid is collected by a mat. The mat being positioned beneath the grow table in the cleaning system. The liquid passes through holes in an upper layer of the mat, thereby filtering out particles from the liquid. After entering the holes, the liquid traverses a plate layer of the mat before reaching a drain in a lower layer of the mat as the lower layer of the mat is non-porous except for the drain. The plate layer includes layers of runners arranged in a grid, the grid of each successive layer is offset at an angle with respect to the grid of a previous layer, thereby the liquid traversing the layers of the plate layer must traverse the grid such that oils and debris that are suspended in the liquid will accumulate within the grid. The method further includes flowing the liquid into a separation tank and removing the liquid from an upper area of the separation tank and into a holding tank, allowing sedimentation of heavier contaminants from the liquid to settle within the separation tank for later removal. The liquid from the holding tank is then used to clean the grow table.

In another embodiment, a cleaning system for cleaning a grow table is disclosed including a series of nozzles. The nozzles are aimed downward toward the grow table for cleaning debris from the grow table with a spray of a liquid. A mat positioned beneath the grow table within the cleaning system is provided for capturing the liquid. The mat has a lower layer that is substantially non-porous except for a drain, a plate layer comprising at least two layers of runners arranged in a grid, the grid of each successive layer is offset at an angle with respect to the grid of a previous layer; and an upper layer covering the plate layer, the upper layer having a plurality of holes for receiving the liquid. A liquid processing system is interfaced to the drain. The liquid processing system cleans and sanitizes the liquid received from the mat. There is a mechanism for returning the liquid from the liquid processing system back to the nozzles.

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
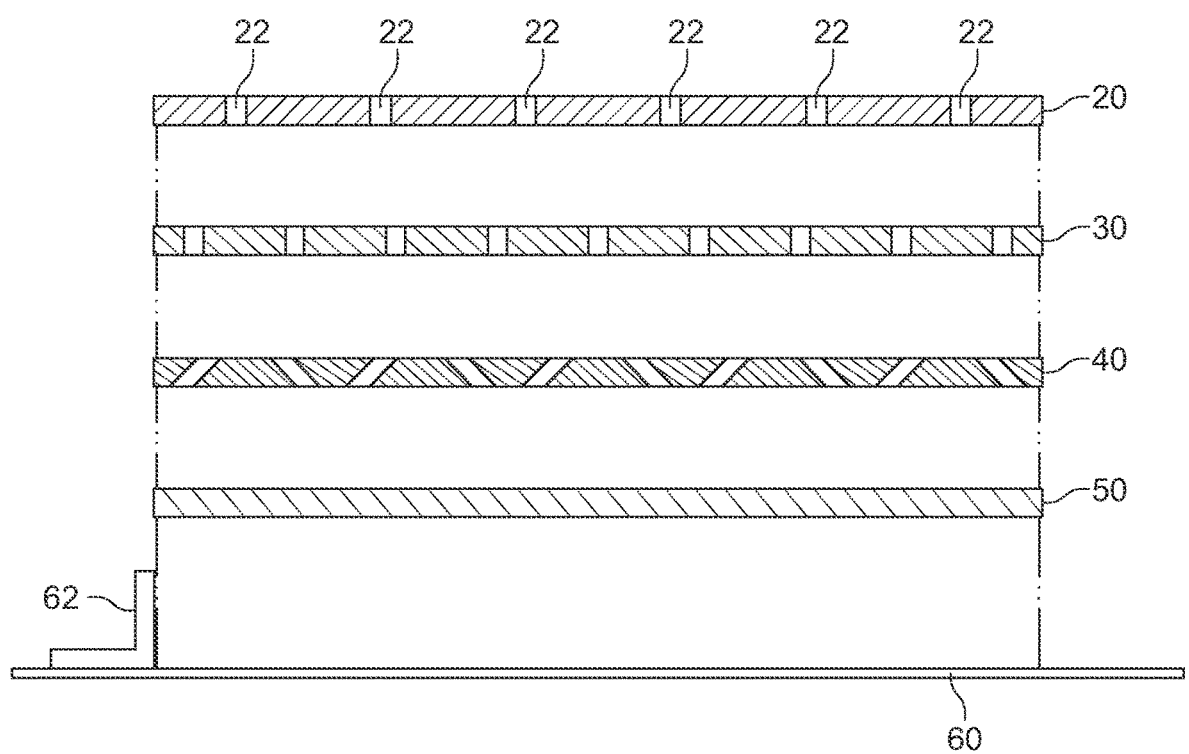
FIG. 1 illustrates a cross-sectional view of a separation portion of a waste and/or hazardous liquid containment and collection system.

Reference will now be made in detail to the presently preferred embodiments of the invention, examples of which are illustrated in the accompanying drawings. Throughout the following detailed description, the same reference numerals refer to the same elements in all figures.

Although the disclosed invention is shown in some embodiments being used for vehicle cleaning, the system disclose is capable of separating and proper disposal of liquids from many different applications including indoor or outdoor plant growing facilities. The disclosed invention is not limited to washing vehicles.

Figure 1A:
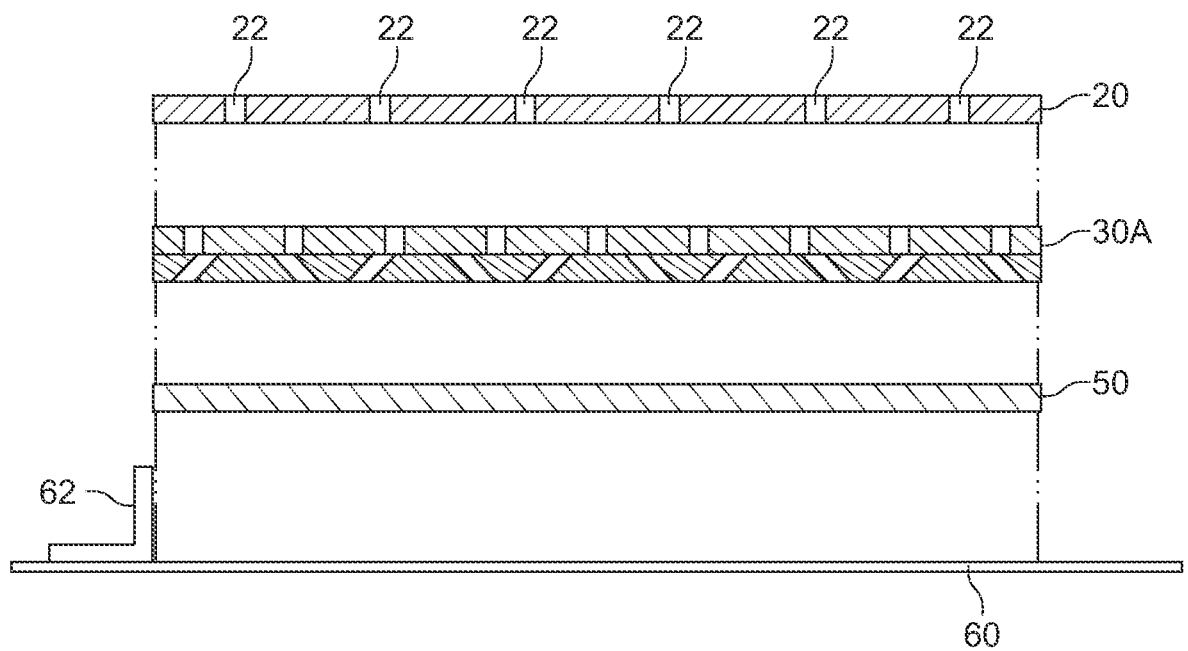
FIG. 1A illustrates a second cross-sectional view of a separation portion of a waste and/or hazardous liquid containment and collection system.
Figure 2:
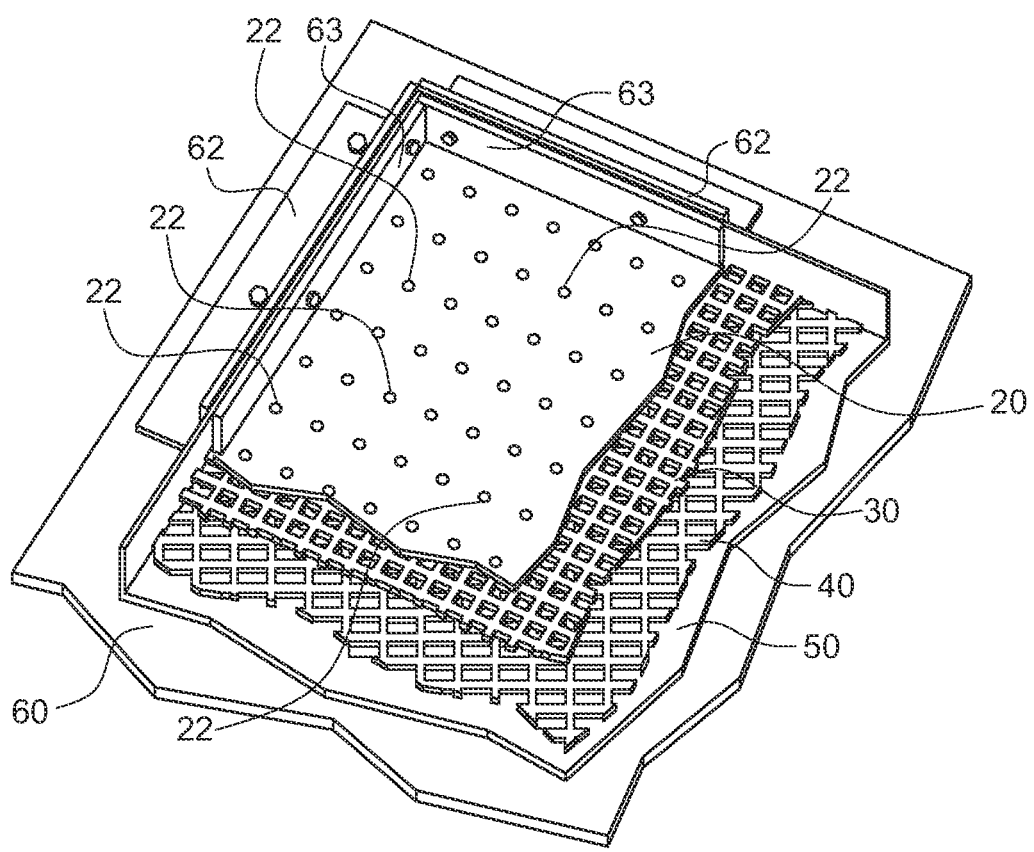
FIG. 2 illustrates a cut-away view of the separation portion of the waste and/or hazardous liquid containment and collection system.

Referring to FIGS. 1, 1A, and 2, cross-sectional and cut-away views of a separation portion of a waste and/or hazardous liquid containment and collection system are shown.

In the process of washing machinery such as vehicles, various chemicals and oils are dislodged from the machinery or vehicles such as gasoline, oils, salts, car wax, tar, etc. Many municipalities prohibit drain water from machinery cleaning or car washes to enter the sewerage and/or drain water system, as these chemicals and oils would then find their way to rivers, streams, and other bodies of water, adding pollutants to such. On the other hand, it is desirable by many to have a clean vehicle, especially in geographies where ice and snow removal include using salts to melt the ice and snow being that such salts are corrosive in nature. Many people like to have clean vehicles and, to enhance the salability of vehicles; automobile dealerships often wash the entire inventory of vehicles on a periodic interval to assure that the fleet of vehicles is appealing to potential buyers.

Many people wash their vehicles at home, in their driveway, using a garden hose and bucket, releasing small amounts of pollutants into the storm drain system, which eventually leads to the above-mentioned bodies of water. Many others wash their vehicles in car wash facilities which typically have bays equipped with a high-pressure source of water/soap and a drain to wash away excess water and dirt. Washing of vehicles in car wash facilities is preferred, in that, it is more cost-effective to process the contaminated water from the washing process than processing the contaminated water at everybody's home.

In addition to cleaning of the wastewater, some localities with limited average rainfall and many localities during drought conditions prohibit washing of vehicles at homes and offices. In such, car washing facilities are required to recycle water so as to use as little as possible. As one could imagine, it is not good to wash a vehicle with unfiltered water from previous washed vehicles. Using such contaminated water results in a dirty vehicle, even after cleaning. Using contaminated water also results in fine grain grit being power-sprayed onto the vehicle which, besides slowly removing waxes and paint from the vehicle, this grit also clogs the high-pressure spray nozzle, requiring frequent cleaning or replacement of the nozzle.

Figure 4:
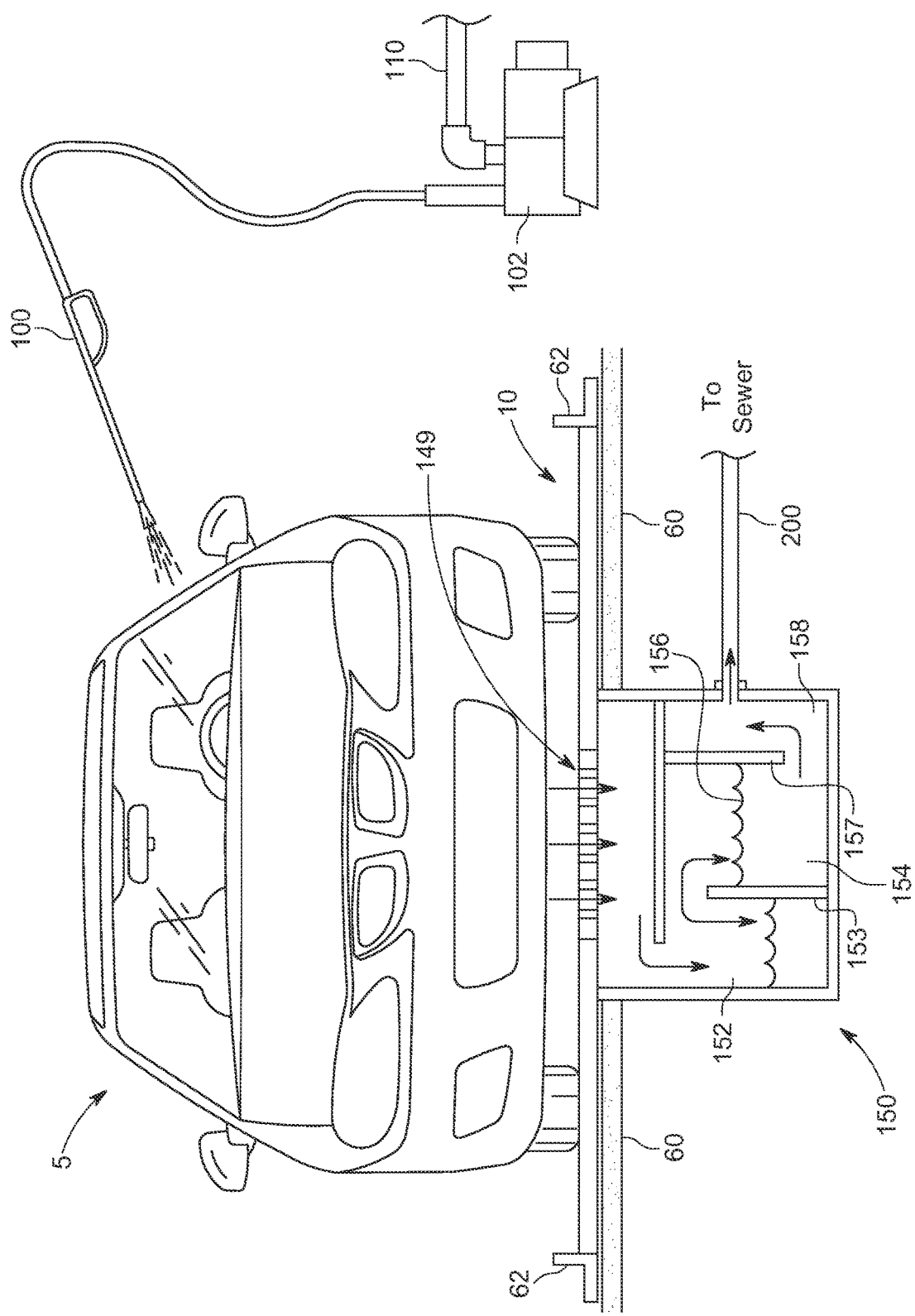
FIG. 4 illustrates a cut-away view of the weir system of the waste and/or hazardous liquid containment and collection system.
Figure 5:
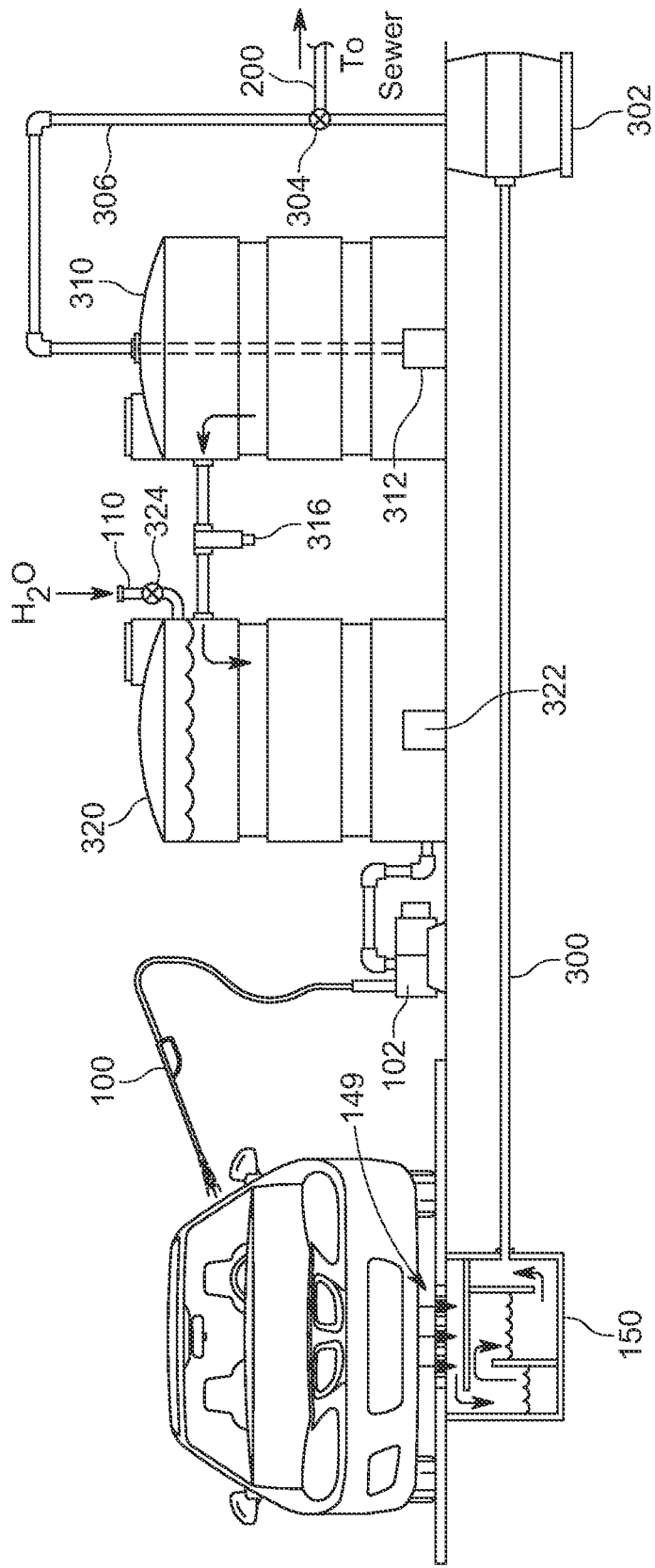
FIG. 5 illustrates a third elevational view of the waste and/or hazardous liquid containment and collection system.
Figure 6:
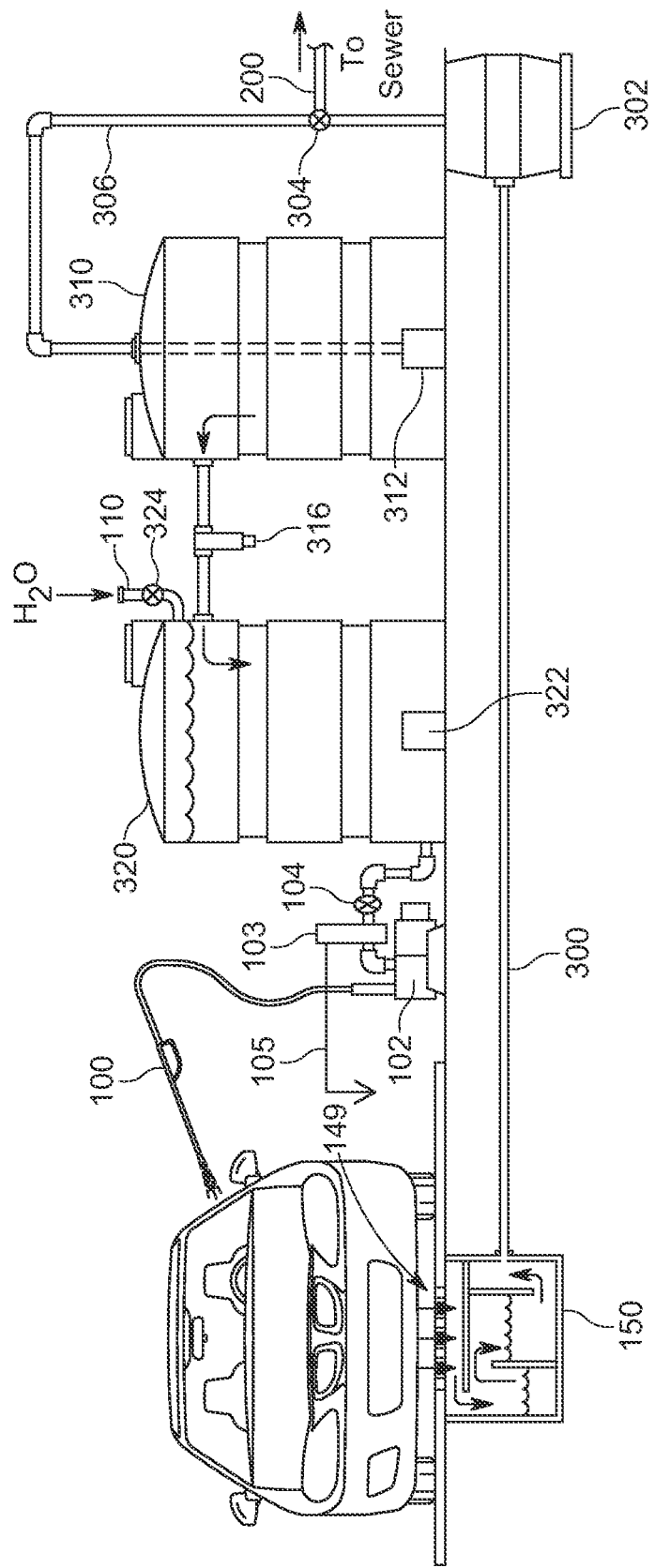
FIG. 6 illustrates a fourth elevational view of the waste and/or hazardous liquid containment and collection system.

To facilitate recycling of the wastewater from the above-described situations, the disclosed waste and/or hazardous liquid containment and collection system includes one or more separation and/or filtering portions, each independent of the other and useful with or without the others. The first such separation and/or filter section is shown in FIG. 1. This separation portion includes several layers 20/30/40/50. The layers 20/30/40 that are permeable are held atop the base layer 50 by wall members 62 that prevent the contaminated liquids from spilling out from the sides of the layers 20/30/40/50. In some embodiments, the base layer 50 is a water-resistant coating on the ground surface 60 (e.g., waterproof paint, sealer, etc.) Although not required, it is anticipated that, in some embodiments, the wall members 62 are fastened to the ground surface 60 (e.g., a cement slab). In some embodiments, plates 63 are fastened to the wall members 62 to secure the layers 20/30/40/50 in place. In a preferred embodiment, the bottom, base layer 50 includes drainage for recycling runoff as shown in FIGS. 4, 5, and 6. Also, although not required, in this preferred embodiment, it is also preferred that there is a slow pitch or incline angled downward with respect to gravity, converging at the drain 149 (see FIGS. 4, 5, and 6).

As contaminated fluids with solids (e.g., water, solids, and pollutants) fall onto the upper layer 20, the contaminated fluids pass through a plurality of holes 22 in the upper layer 20, filtering out large debris such as stones, paper, etc.

The next two layers are plate layers 30/40 are made of geo-membranes or membranes arranged in a grid or similar geometric pattern. The upper plate layer 30 is set over the lower plate layer 40. In a preferred embodiment, the upper plate layer 30 is offset at an angle with respect to the lower plate layer 40. Although any angle is anticipated, an example of one angle is 45 degrees, in that, lines of the grid of the upper plate layer 30 are at 45-degree angles with respect to lines of the grid of the lower plate layer 40. By arranging the plate layers 30/40 in this offset angle, as shown in FIG. 2, on top of the base layer 50, contaminated water with suspended oils must traverse the plate layers 30/40 to reach the drain. As the contaminated water with suspended oils traverses the plate layers 30/40, oil droplets (the leading pollutant) are forced to increase in size, thereby speeding separation from other liquids such as water. As the contaminated water with suspended oils enters the plate layers 30/40, the contaminated water with suspended oils flows towards the drain, e.g., by a slight incline. The contaminated water with suspended oils must traverse the plate layers 30/40. As the contaminated water with suspended oils goes over runners of the lower plate layer 40, pollutants that have a higher specific gravity than water remain within the grid of the lower plate layer 40 and as the fluid goes under runners of the upper plate layer 30, pollutants that have lower specific gravity than water remain within the grid of the upper plate layer 30, thereby filtering out much of the pollutants before they reach the drain 149.

After some number of uses, the upper layer 20 is lifted and the oil is vacuumed out of the plate layers 30/40 for proper disposal and recycling.

As an example, the plate layers 30/40 are textured geo-membranes made by co-extruding textured, high-density polyethylene providing chemical resistance and sufficient load carrying abilities to support the weight of most vehicles.

A slightly modified separation and/or filter section is shown in FIG. 1A. This separation portion includes several layers 20/30A/50. The layers 20/30A that are permeable are held atop the base layer 50 by wall members 62 that prevent the contaminated liquids from spilling out from the sides of the layers 20/30A/50. In some embodiments, the base layer 50 is a water-resistant coating on the ground surface 60 (e.g., waterproof paint, sealer, etc.) Although not required, it is anticipated that, in some embodiments, the wall members 62 are fastened to the ground surface 60 (e.g., a cement slab). In some embodiments, plates 63 are fastened to the wall members 62 to secure the layers 20/30A/50 in place. In a preferred embodiment, the bottom, base layer 50 includes drainage for recycling runoff as shown in FIGS. 4 and 5. Also, although not required, in this preferred embodiment, it is also preferred that there is a slow pitch or incline angled downward with respect to gravity, converging at the drain 149 (see FIGS. 4 and 5).

As contaminated fluids with solids (e.g., water, solids, and pollutants) fall onto the upper layer 20, the contaminated fluids pass through a plurality of holes 22 in the upper layer 20, filtering out large debris such as stones, paper, etc.

The next layer is a plate layer 30A made of geo-membranes or membranes arranged in a grids or similar geometric pattern. The plate layer 30A is manufactured with grid layers (any number of two or more grid layers) that are offset to each other at an angle with respect to the subsequent grid layer. Although any angle is anticipated, an example of one angle is 45 degrees, in that, the grid of a first layer of the plate layer 30A is offset at a 45-degree angle with respect to a grid of a second layer of the plate layer 30A. By arranging the layers in this offset angle, as shown in FIG. 2, contaminated water with suspended oils must traverse the layers of the plate layer 30A to reach the drain. As the contaminated water with suspended oils traverses the layers of the plate layer 30A, oil droplets (the leading pollutant) are forced to increase in size, thereby speeding separation from other liquids such as water. As the contaminated water with suspended oils enters the layers of the plate layer 30A, the contaminated water with suspended oils flow towards the drain, e.g., by a slight incline. The contaminated water with suspended oils must traverse the layers of the plate layer 30A. As the contaminated water with suspended oils goes over runners of a lower layer of the plate layer 30A, pollutants that have a higher specific gravity than water remain within the grid of the lower layer of the plate layer 30A and as the fluid goes under runners of the upper layer of the plate layer 30A, pollutants that have lower specific gravity than water remain within the grid of the upper layer of the plate layer 30A, thereby filtering out much of the pollutants before they reach the drain 149.

After some number of uses, the upper layer 20 is lifted and the oil/pollutants is vacuumed out of the plate layer 30A for proper disposal and recycling.

As an example, the plate layer 30A is fabricated as multiple layers of textured geo-membranes made by molding or co-extruding textured, high-density polyethylene providing chemical resistance and sufficient load carrying abilities to support the weight of most vehicles.

Any base layer 50 is anticipated such as a reinforced polypropylene as known for use as a liner for containment ponds (with drain 149).

Figure 3:
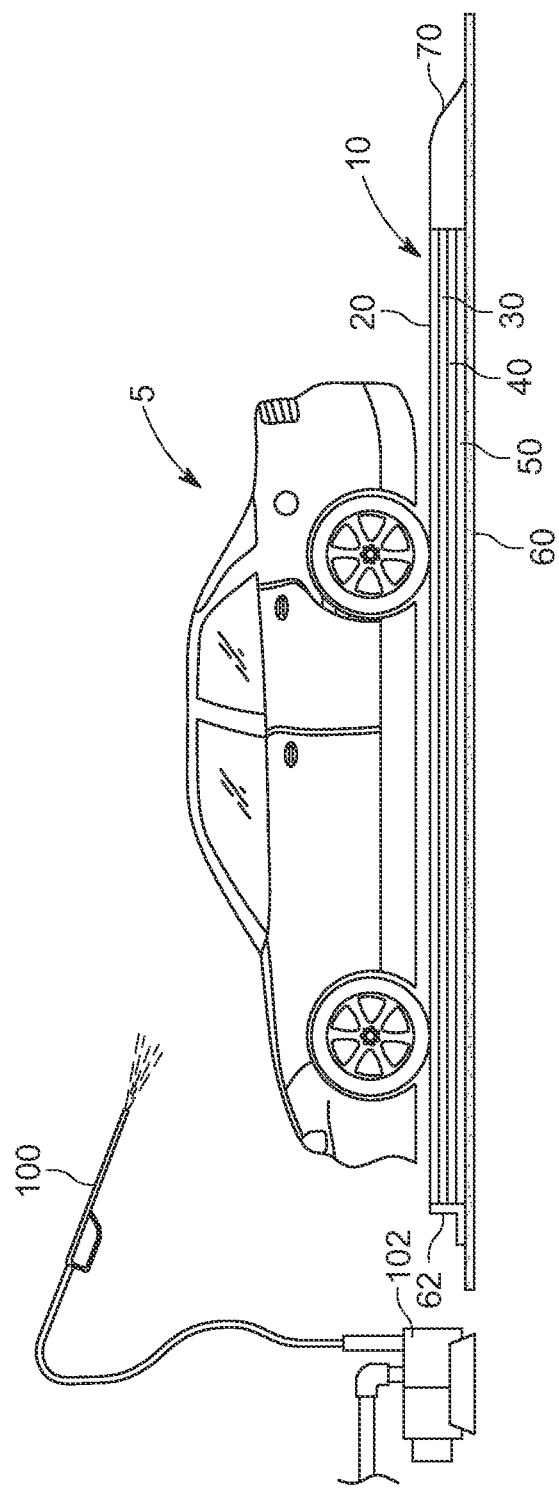
FIG. 3 illustrates an elevational view of the waste and/or hazardous liquid containment and collection system.

Referring to FIG. 3, a plan view of the waste and/or hazardous liquid containment and collection system 10 is shown. In this example, a ramp 70 is provided to ease driving of a vehicle 5 onto the collection system 10. For completeness, the processed liquid is returned by a pump 102 (e.g., a high-pressure pump) and a washing wand 100 are shown. In operation, dirt and debris are dislodged from the vehicle 5 by the high-pressure water from the washing wand 100 and the now contaminated water, for example having dirt and oils suspended there within, fall onto the upper layer 20 of the collection system 10. The holes 22 in the upper layer 20 filter out large particles such as stones and also reduce splashing of the contaminated water onto the remaining layers 30/40/50. As the contaminated water flows traverses the plate layers 30/40, any oil suspended in the water beads into droplets that further combine with existing droplets of oil and remains within the netting of the plate layers 30/40 as per the nature of Stokes' Law. In such, the sedimentation of the droplets of oil separates the oil from the water. The water (still contaminated with other pollutants) flows to a low spot of the collection system 10 while most of the oil remains within the plate layers 30/40. As in FIGS. 4, 5, and 6, a drain 149 at the low area of the base layer 50 permits collection of the water (with some contaminates). After some number of uses, the upper layer 20 is lifted and the oil is vacuumed out of the plate layers 30/40 for proper disposal and recycling.

Figure 3A:
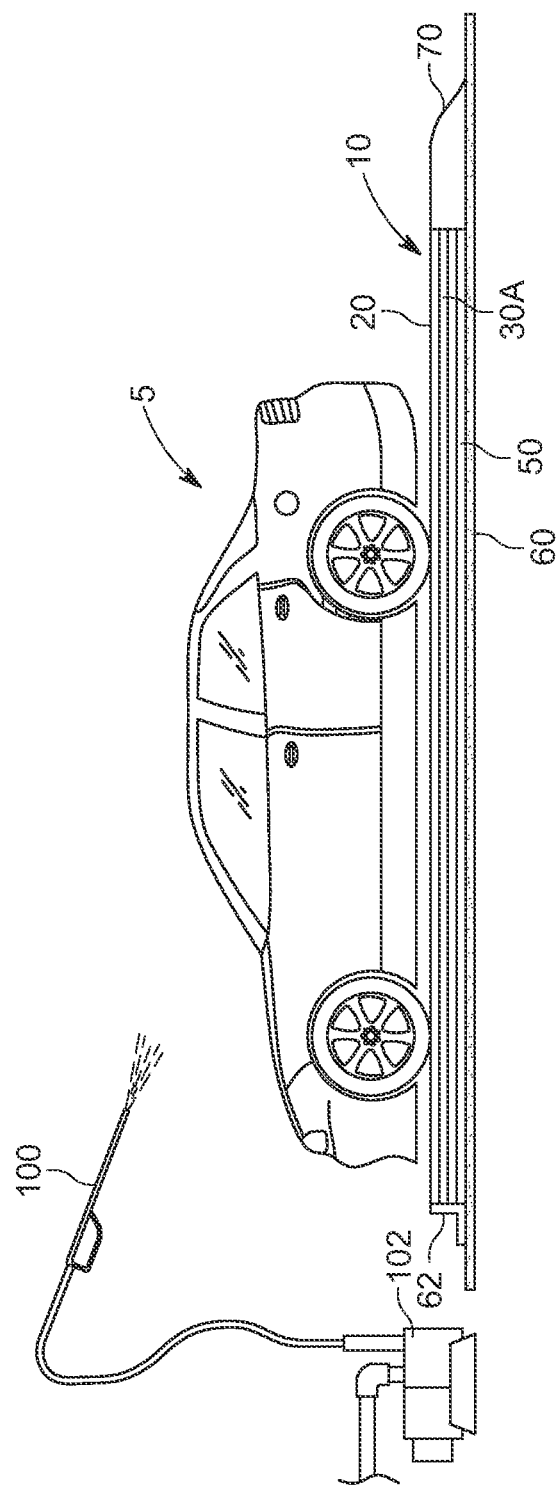
FIG. 3A illustrates a second elevational view of the waste and/or hazardous liquid containment and collection system.

Referring to FIG. 3A, a plan view of the waste and/or hazardous liquid containment and collection system 10 is shown. In this example, a ramp 70 is provided to ease driving of a vehicle 5 onto the collection system 10. For completeness, a pump 102 and a washing wand 100 are shown. In operation, dirt and debris are dislodged from the vehicle 5 by the high-pressure water from the washing wand 100 and the now contaminated water, for example having dirt and oils suspended there within, fall onto the upper layer 20 of the collection system 10. The holes 22 in the upper layer 20 filter out large particles such as stones and also reduce splashing of the contaminated water onto the remaining layers 30A/50. As the contaminated water flows traverses the plate layer 30A, any oil suspended in the water beads into droplets that further combine with existing droplets of oil and remains within the netting of the plate layer 30A as per the nature of Stokes' Law. In such, the sedimentation of the droplets of oil separates the oil from the water. The water (still contaminated with other pollutants) flows to a low spot of the collection system 10 while most of the oil remains within the plate layer 30A. As in FIGS. 4, 5, and 6, a drain 149 at the low area of the base layer 50 permits collection of the water (with some contaminates). After some number of uses, the upper layer 20 is lifted and the oil is vacuumed out of the plate layer 30A for proper disposal and recycling.

Referring to FIGS. 4, 5, and 6, alternate installations of the waste and/or hazardous liquid containment and collection system 10 are shown. In these examples of installations of the collection system 10, after removal of the oils by the plate layers 30/40 per the above explanation, the run-off, dirty water falls through a drain 149 in the base layer 50. Although not required, it is preferred that the layers 20/30/40/50 are slightly pitched towards the drain 149 to facilitate a slow flow of fluid towards the drain 149.

After falling through the drain 149, the run-off, dirty water is further processed by separation tank 150. In this exemplary separation tank 150 (see FIG. 4 for details), the dirty water enters into a first compartment 152. As the first compartment 152 fills, the now cleaner water flows over a weir 153 into a second compartment 154. In such, contaminates that have a higher specific gravity than water (e.g., sand, metal) settle to the bottom of the first compartment 152 and the water and contaminates that have a lower specific gravity than water (e.g., remaining oils, plastics) flow over the weir 153 and into the second compartment 154. In the second compartment 154, contaminates that have a lower specific gravity than water tend to float to the top 156 of the second compartment 154 while the, now, reclaimed water exits from the bottom of the second compartment 154 under a partition 157 (e.g., an inverted weir) and into an exit compartment 158, where the reclaimed water exits, for example, into the sewerage drain 200. As with the plate layers 30/40, after some number of uses, debris, soil, leaf material, sand, contaminates are vacuumed out of the compartments 152/154/158 and disposed or recycled according to accepted practices.

In FIG. 4, the reclaimed water is not recycled, entering the sewerage drain 200 or any other known wastewater disposal system (not shown). In such, fresh water is supplied for cleaning the vehicle 5, for example, from a municipal water supply 110 or well and pump.

In FIG. 5, the reclaimed water exiting the separation tank 150 is gravity fed to a sump 302 through tube 300. When the sump 302 fills to a certain point, the reclaimed water from within the sump 302 is pumped out through an exit pipe 306 and is directed by a valve 304 to either the sewerage drain 200 (or other drainage system) or into filtering and separation tanks 310/320. The reclaimed water in the first separation tank 310 is preferably treated with aeration from an air pump 312. As the first separation tank 310 approaches being filled with the reclaimed water, some of the reclaimed water exits the first separation tank 310 from an upper area to exclude some amount of sedimentation, and this water passes through a filter 316, for example, a paper filter, sand filter, carbon filter, etc. The now, substantially clean water enters the second separation tank 320 which optionally has a second aeration pump 322. Should the system lose water (fluid) due to, for example, splashing, evaporation, and some water remaining on the vehicle 5, additional water is added from, for example, a municipal water supply 110 through a supply valve 324 that is used to control the amount of water that is added to the system.

Water (substantially clean water) is then drawn from the bottom of the second separation tank 320. By drawing the water from the bottom of the second separation tank 320, the second separation tank 320 serves as a reservoir, in that, the system will operate and not need refilling from the municipal water supply 110 until the second separation tank 320 is substantially depleted. This requires fewer operations to add water from the supply. In some embodiments (not shown), the supply valve 324 is automatically operated when an electronic device (e.g., a float or other device) determines that the water level in the second separation tank 320 is below a certain level.

In FIG. 6, a similar approach to further cleaning the reclaimed water is shown. The reclaimed water exits the separation tank 150 and is gravity fed to a sump 302 through a tube 300. When the sump 302 fills to a certain point, the reclaimed water from within the sump 302 is pumped out through an exit pipe 306 and is directed by a valve 304 to either the sewerage drain 200 (or other drainage system) or into filtering and separation tanks 310/320.

In this embodiment, the valve 304 directs the reclaimed water into the first separation tank 310. In some embodiments, the reclaimed water in the separation tank 310 is treated with aeration from an air pump 312. As the first separation tank 310 approaches being filled with the reclaimed water, some of the reclaimed water exits the first separation tank 310 from an upper area to exclude some amount of sedimentation that occurs in the separation tank 310. In some embodiments, this reclaimed water then passes through a filter 316, for example, a paper filter, sand filter, carbon filter, etc. The now, substantially cleaner reclaimed water enters a second separation tank 320 which, in some embodiments, has a second aeration pump 322. Should the system lose water (fluid) due to, for example, splashing, evaporation, etc., additional water is added, for example, from a municipal water supply 110 through a supply valve 324 that is used to control the amount of municipal water that is added to the system.

Water (substantially clean water) is then drawn from the second separation tank 320. In some embodiments, the water is drawn from the bottom of the second separation tank 320 and the second separation tank 320 serves as a reservoir, in that, the system will operate and not need refilling from the municipal water supply 110 until the second separation tank 320 is substantially depleted. This requires fewer operations to add water from the supply. In some embodiments (not shown), the supply valve 324 is automatically operated when an electronic device (e.g., a float or other device) determines that the water level in the second separation tank 320 is below a certain level.

In FIG. 6, an additional reverse osmosis filter system 103/104 further cleans the reclaimed water (and municipal water) from the second separation tank 320 before this water is used (e.g., to wash a vehicle or water plants). In this example, the reverse osmosis filter system 103/104 includes a bladder 103 and a pump 104, the pump 104 forcing the reclaimed water through the bladder at a rated pressure for the bladder 103. Note that the reverse osmosis filter system 103/104 is shown simplified as there are other components in a reverse osmosis filter system 103/104 that are not shown for clarity and brevity reasons. For example, many reverse osmosis filter systems 103/104 flow water over the bladder 103 to clean the bladder 103. The, now, contaminated water of such must be disposed. In the example shown in FIG. 6, the contaminated water from the reverse osmosis filter system 103/104 exits through a tube 105 and is directed to run back through the above-described system, either falling on the separation portion layers 20/30/40/50 or directly into the separation tank 150, etc.

Figure 7:
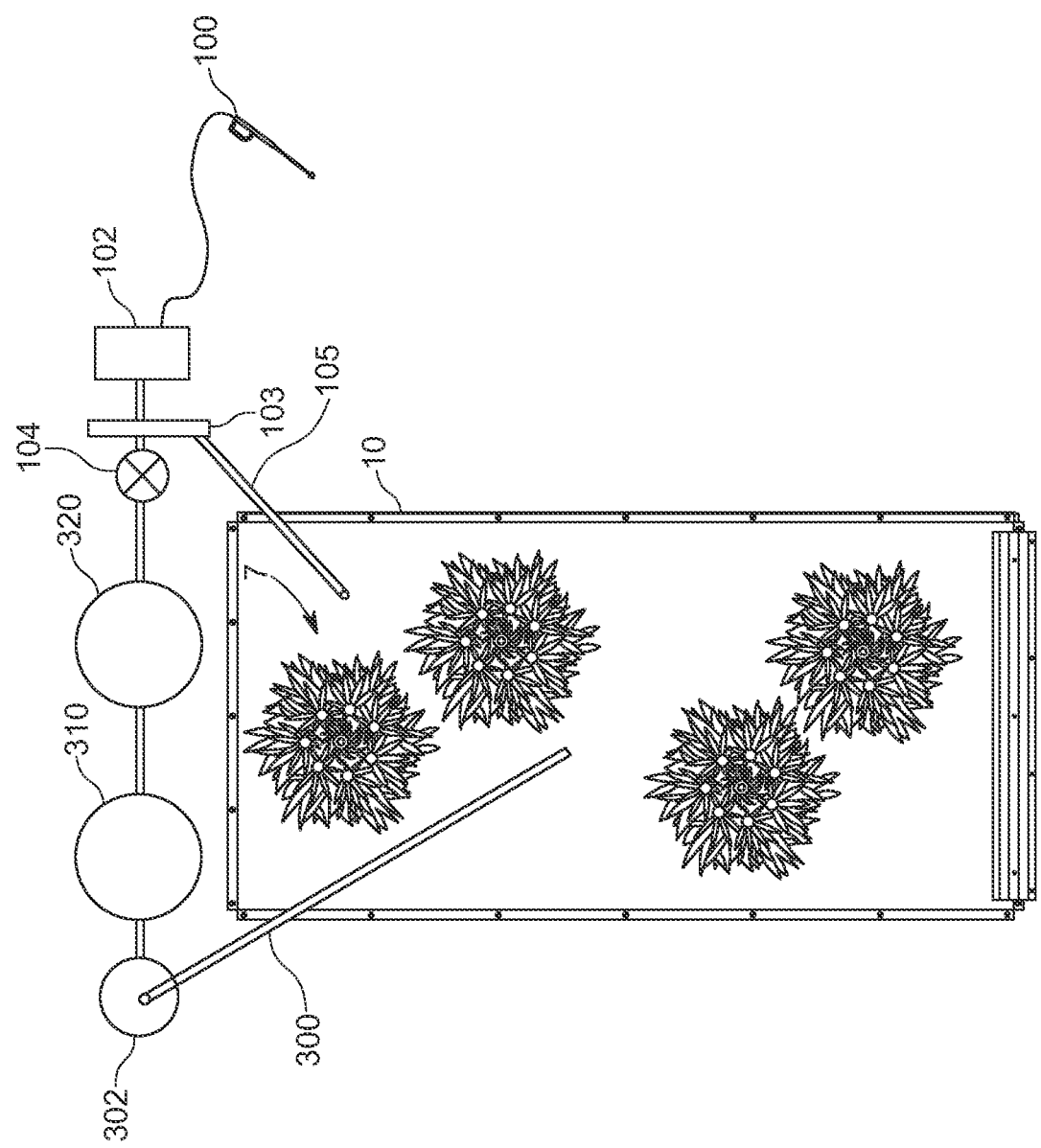
FIG. 7 illustrates a plan view of the waste and/or hazardous liquid containment and collection system in use with plants.
Figure 8:
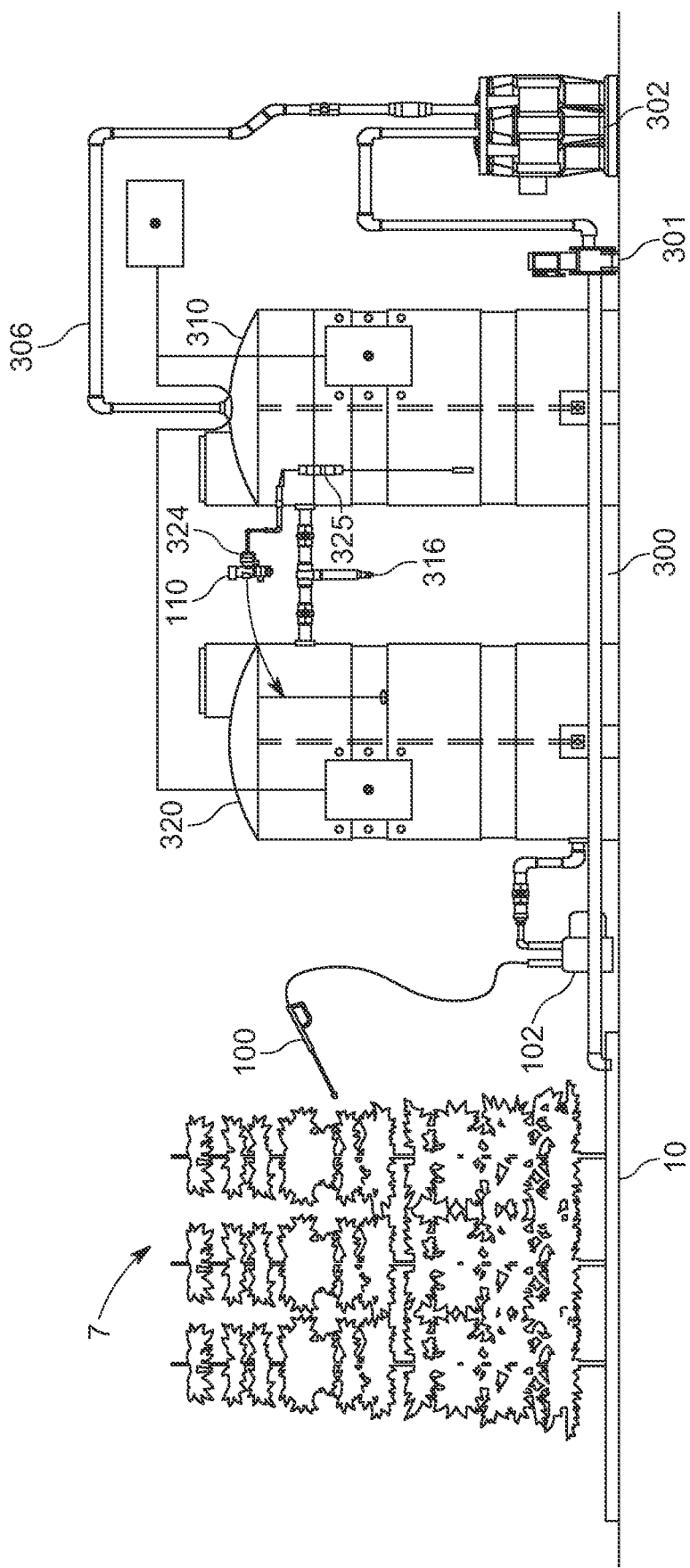
FIG. 8 illustrates a elevational view of the waste and/or hazardous liquid containment and collection system in use with plants.

In FIGS. 7 and 8, the collection system 10 is shown being used with live plants 7. Note this is shown with the optional reverse osmosis filter system 103/104 in FIG. 7 and without in FIG. 8. When present, the optional reverse osmosis filter system 103/104 further cleans the reclaimed water (and municipal water) from the second separation tank 320 before this water is used to water or wash the live plants 7.

In FIG. 7, the collection system 10 is shown with multiple plants 7. As the live plants 7 are watered or cleaned, excess water, possibly mixed with soil from runoff, leaves, etc., falls onto the collection system 10 and is pre-cleaned using the above-described grid system, exiting through a tube 300 to the sump 302 (or equivalent tank), then through the first separation tank 310 and second separation tank 320, and optionally one or more filters. 316. When water is needed for further irrigation or for cleaning the live plants 7, in some embodiments, the reclaimed water is further cleaned using the optional reverse osmosis filter system 103/104.

In this example, the reverse osmosis filter system 103/104 includes a bladder 103 and a pump 104, the pump 104 forcing the reclaimed water from the second separation tank 320 through the bladder at a rated pressure for the bladder 103. Note that the reverse osmosis filter system 103/104 is shown simplified as there are other components in a reverse osmosis filter system 103/104 that are not shown for clarity and brevity reasons. For example, many reverse osmosis filter systems 103/104 flow water over the bladder 103 to clean the bladder 103. The, now, contaminated water from such must be properly disposed. In the example shown in FIG. 7, the contaminated water from the reverse osmosis filter system 103/104 exits through a tube 105 and is directed to run back through the above-described system, either falling on the separation portion layers 20/30/40/50 or directly into the separation tank 150, etc.

In FIG. 8, after water from the live plants 7 falls on the collection system 10, the water is directed to the drain 149, in some embodiments, the reclaimed water is further processed by separation tank 150 (not shown in FIG. 8). Although, in some embodiments, gravity is used to transport the reclaimed water to the sump 302 (or other holding tank), in this embodiment, a pump 301 is used to move the reclaimed water from the collection system 10, through plumbing such as a tube 300, and to the sump 302.

When the sump 302 fills to a certain point, the reclaimed water from within the sump 302 is pumped out through an exit pipe 306 and into filtering and separation tanks 310/320.

As the first separation tank 310 approaches being filled with the reclaimed water, some of the reclaimed water exits the first separation tank 310 from an upper area to exclude some amount of sedimentation that occurs in the separation tank 310. In some embodiments, this reclaimed water then passes through a filter 316, for example, a paper filter, sand filter, carbon filter, etc. Should the system lose water (fluid) due to, for example, splashing, evaporation, etc., additional water is added, for example, from a municipal water supply 110 through a supply valve 324 that is used to control the amount of municipal water that is added to the system. In some embodiments, a level sensor 325 provides data regarding the fluid level within the first separation tank 310.

Reclaimed water (substantially clean water) is then drawn from the second separation tank 320. In some embodiments, the water is drawn from the bottom of the second separation tank 320 and the second separation tank 320 serves as a reservoir, in that, the system will operate and not need refilling from the municipal water supply 110 until the second separation tank 320 is substantially depleted. This requires fewer operations to add water from the supply. In some embodiments (not shown), the supply valve 324 is automatically operated when the level sensor signals that the water level in the first separation tank 310 is below a certain level.

In some embodiments, the now clean reclaimed water (and/or municipal water) is used to irrigate and/or wash the live plants 7. In some embodiments, a pump 102 and a washing wand 100 are connected to the second separation tank 320 as, for certain live plants 7, pressure washing is performed before harvest to remove dead foliage and any foreign matter that may have settled on the live plants 7.

Figure 9:
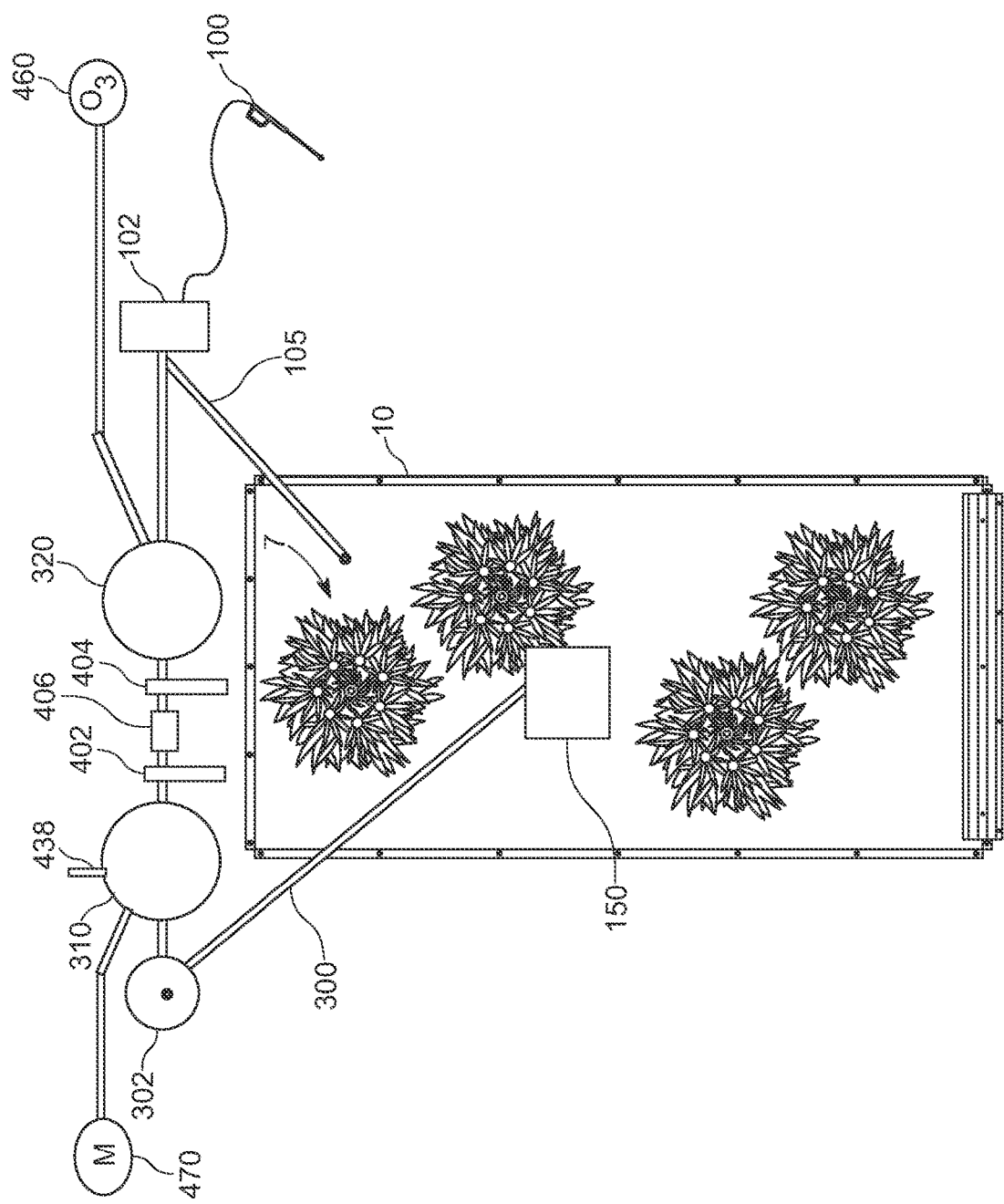
FIG. 9 illustrates a plan view of the waste and/or hazardous liquid containment and collection system for watering plants and cleaning plant grow areas.
Figure 10:
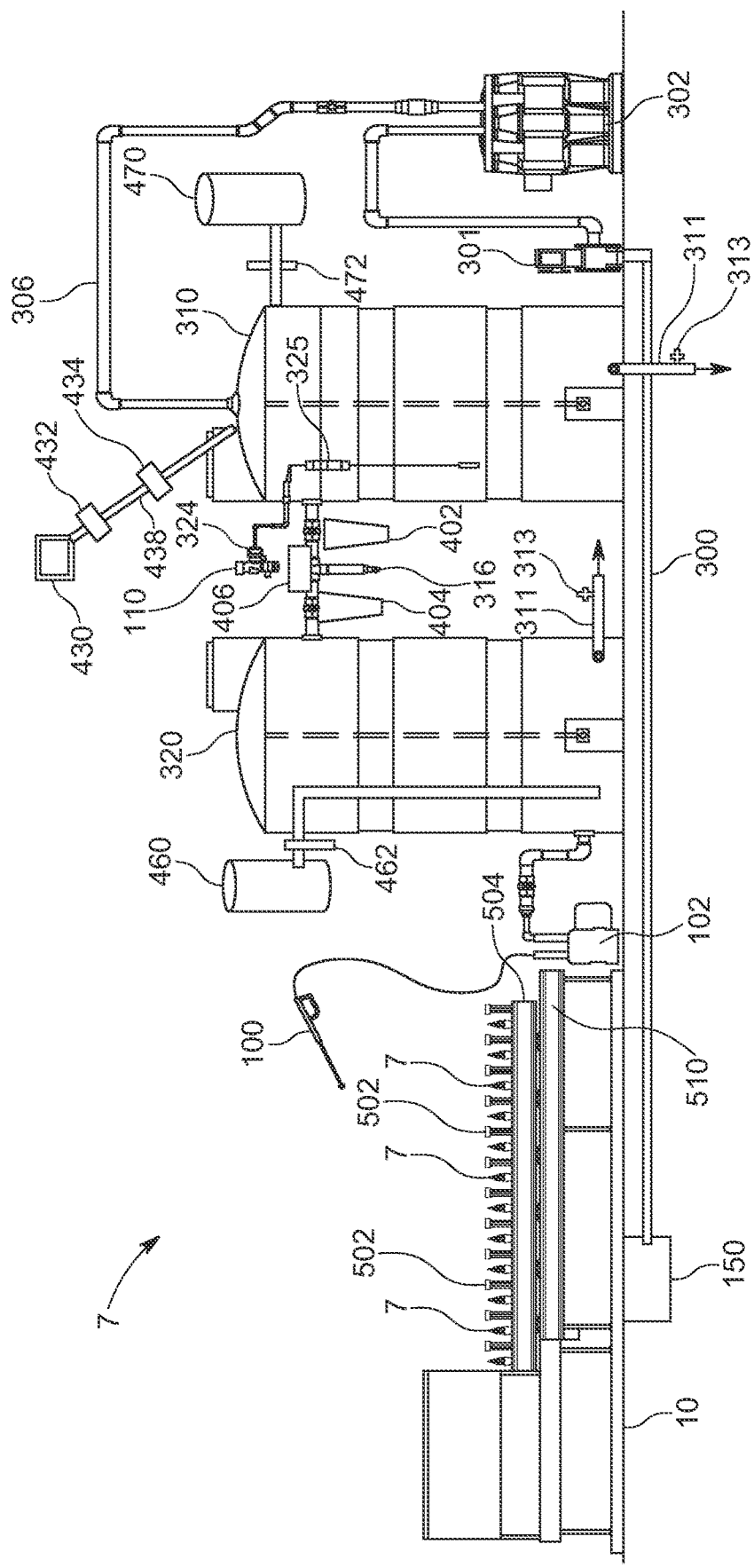
FIG. 10 illustrates an elevational view of a grow table positioned in a grow area with plants growing.

In FIGS. 9 and 10, the collection system 10 is shown configured for watering specific live plants 7 and, after harvest, cleaning the grow area.

In FIG. 9, the collection system 10 is shown with multiple live plants 7. As the live plants 7 are watered or growing areas cleaned, excess water, possibly mixed with soil from runoff, leaves, etc., falls onto the collection system 10 and is pre-cleaned using the above-described grid system, exiting through a tube 300 to the sump 302 (or equivalent tank), then through the first separation tank 310 and second separation tank 320, and optionally one or more filters 402/404 and ultraviolet exposing device 406. The water is cleaned for further irrigation or for cleaning the live plants 7.

In some embodiments, an ozone generator 460 is used to inject ozone ($O_3$) into the second separation tank 320 for killing potentially harmful microbes. In some embodiments, microscopic organisms 470 is added into the first separation tank 310. In some embodiments, rainwater is routed into the first separation tank 310 through a conduit 438.

The separation tanks 310/320 have a drain outlet 311 near the bottom of each separation tank 310/320 controlled by a valve 313 (electronic or manual) for discharging sludge that accumulates at the bottom of the separation tanks 310/320.

FIG. 10 shows an elevational view of collection system 10 with plants 7 in place on a grow table 504. Although not required, it is anticipated that the grow table 504 is porous allowing liquids and impurities to fall onto the collection system 10 for reclamation of the water and separation of the impurities. In this example, optional plant watering towers 502 are shown, though any form of plant 7 watering is anticipated. In embodiments having the plant watering towers 502, each the plant watering towers 502 has one or more drip watering tubes 506 (see FIG. 11) for drip irrigation of the plants 7. In FIG. 10, after watering/runoff of the live plants 7 or cleaning the grow area, water, debris, soil, etc., falls on the collection system 10, the water is directed to the drain 149, in some embodiments, the reclaimed water is further processed/cleaned by the separation tank 150. The reclaimed water is directed to the sump 302 (or other holding tank), either by gravity and/or a pump 301, through plumbing such as a tube 300, and to the sump 302.

When the sump 302 fills to a certain point, the reclaimed water from within the sump 302 is pumped out through an exit pipe 306 and into filtering and separation tanks 310/320, starting in the first separation tank 310.

As the first separation tank 310 approaches being filled with the reclaimed water, some of the reclaimed water exits the first separation tank 310 from an upper area to exclude some amount of sedimentation that occurs within the separation tank 310. In some embodiments, this reclaimed water passes through one or more filters 402/404, for example, a paper filter, sand filter, carbon filter, etc., and in some embodiments, through an ultraviolet exposing device 406 that kills microbes within the water using ultraviolet light. Should the system lose water (fluid) due to, for example, splashing, evaporation, etc., additional water is added, for example, from a municipal water supply 110 through a supply valve 324 that is used to control the amount of municipal water that is added to the system. In some embodiments, a level sensor 325 provides data regarding the fluid level within the first separation tank 310 indicating when replenishment is needed.

In some embodiments, rainwater is captured from, for example, a rain gutter 430. The rainwater flows through a conduit and into the first separation tank 310. In some embodiments, the rainwater is filtered to remove debris (e.g., leaves) by a filter 432 and flow of the rainwater is controlled by a valve 434 to prevent overflowing of the first separation tank.

The second separation tank 320 provides storage for the reclaimed water (substantially clean water) which is then drawn from the second separation tank 320 for use with the live plants 7 or for cleaning the plant grow area. In some embodiments, the water is drawn from the bottom of the second separation tank 320 and the second separation tank 320 serves as a reservoir, in that, the system will operate and not need refilling from the municipal water supply 110 until the second separation tank 320 is substantially depleted. This requires fewer operations to add water from the supply. In some embodiments, the supply valve 324 is automatically operated when the level sensor signals that the water level in the first separation tank 310 is below a certain level.

In some embodiments, microscopic organisms or nutrients from microscopic organisms tank 470 is metered by a microbiology control valve 472 into the first separation tank 310 for conditioning the water, as needed.

In some embodiments, ozone from an ozone generator 460 is metered by a control valve 462 into the second separation tank 320 for killing microbes, as needed.

In some embodiments, the now clean reclaimed water (and/or municipal water) is returned back to the plant area and used to irrigate and/or wash the live plants 7. In some embodiments, a pump 102 and a washing wand 100 are connected to the second separation tank 320 as, for certain live plants 7, pressure washing is performed before harvest to remove dead foliage and any foreign matter that may have settled on the live plants 7. The pressurized water is also used to clean the plant grow areas before a new crop is started.

As in many growing arrangements, the plants 7 are grown to a certain phase, ither for sale or harvest, and either removed (for sale) or cut (for harvest). Once the plants are sold or harvested, it is often desired to clean the grow table 504, for example, to remove dead leaves, debris, soil remnants, etc. One way to clean the grow table 504 is using a washing wand 100 or other hose/nozzle arrangement. As will be shown in FIGS. 11 and 12, another way to clean the grow table 504 is to transport the grow table 504 through a cleaning system 600 as shown in FIG. 13. To facilitate transporting of transport the grow table 504 through a cleaning system 600, in some embodiments, the grow table 504 is upon a roller table 510 similar to those used by manufacturing companies to slide shipping boxes or containers. In such, it is anticipated that, the roller table 510 supports more than one grow tables 504 and extends into and, optionally, beyond the cleaning system 600 and the grow tables 504 are sequentially moved through the cleaning system 600. Further, in some embodiments, the roller table 510 is a continuous loop so that after exiting the cleaning system 600, the grow tables 504 are able to loop back into the growing area.

Figure 11:
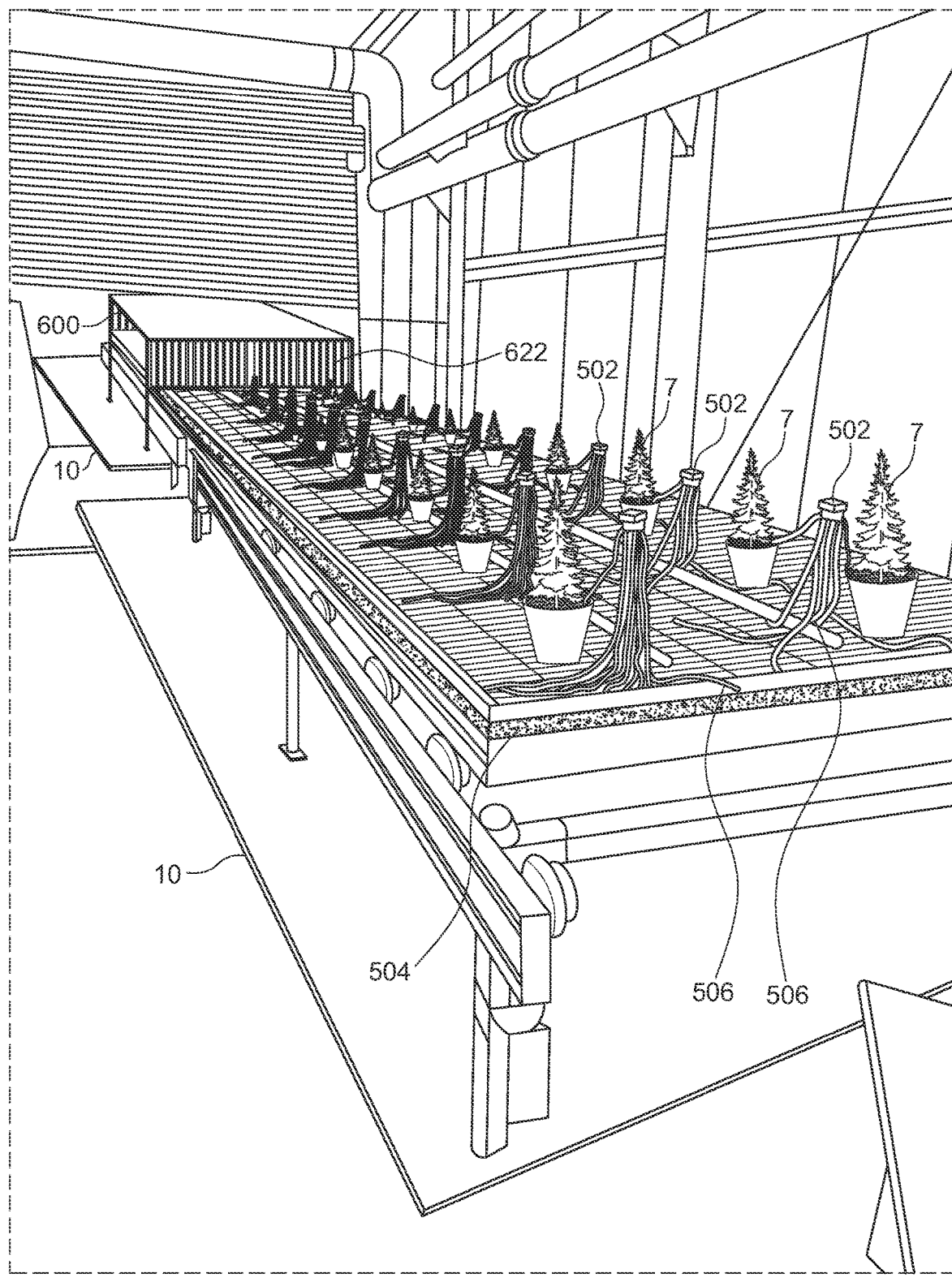
FIG. 11 illustrates the grow table of the collection system in the grow area with plants and a watering system.

Referring to FIG. 11, a perspective view of the grow table 504 of the collection system 10 is shown with plants 7 in a growing area. In this view, the plant watering towers 502 are shown with drip watering tubes 506 directed into the soil of the plants 7 for watering the plants 7. As excess water spills or flows, for example, from the plants 7 or as the plants are periodically washed, the excess water and impurities fall to the collection system 10 and is processed as above.

Figure 12:
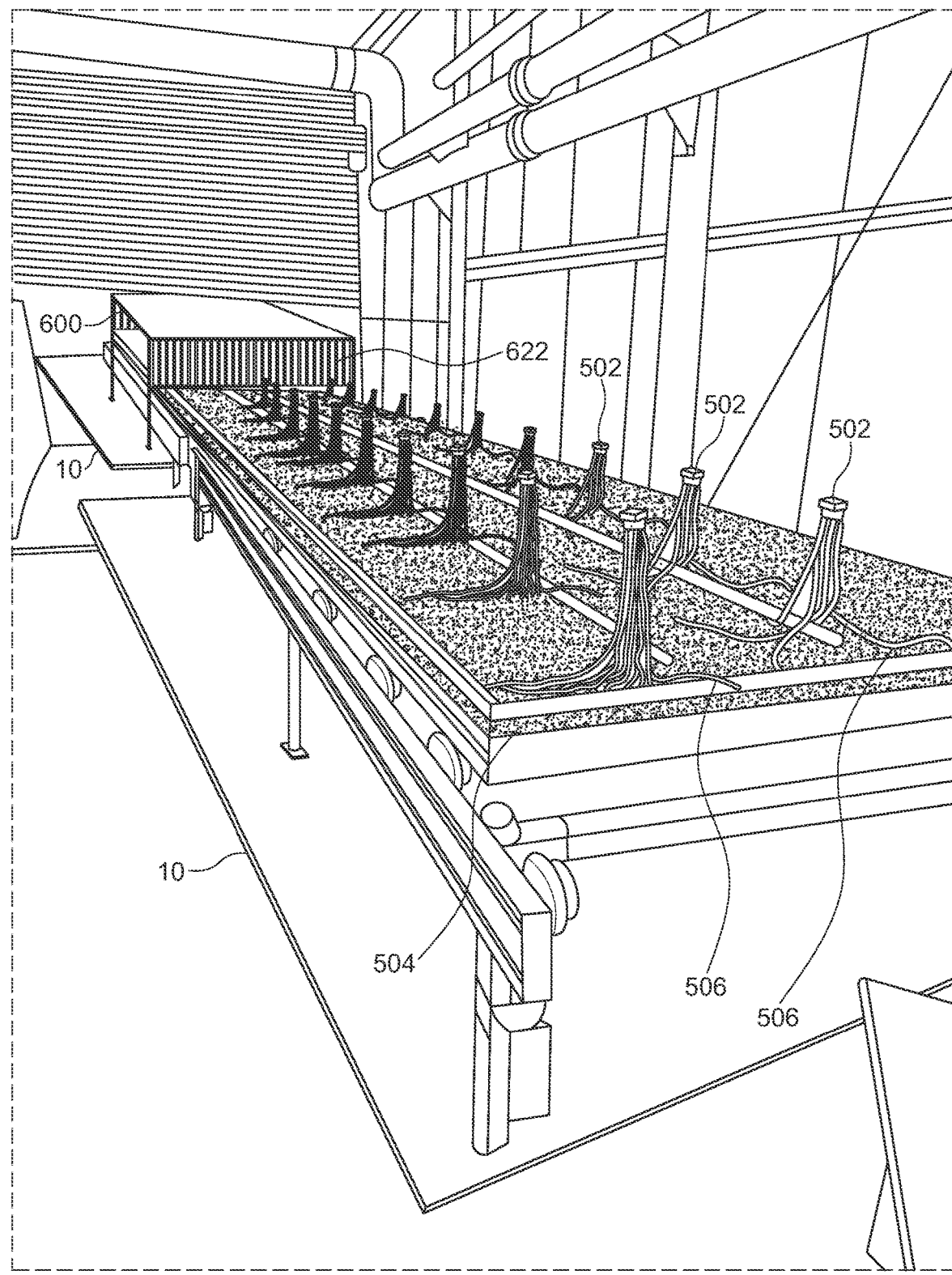
FIG. 12 illustrates the grow table of the collection system in the grow area after the plants have been removed or harvested.
Figure 13:
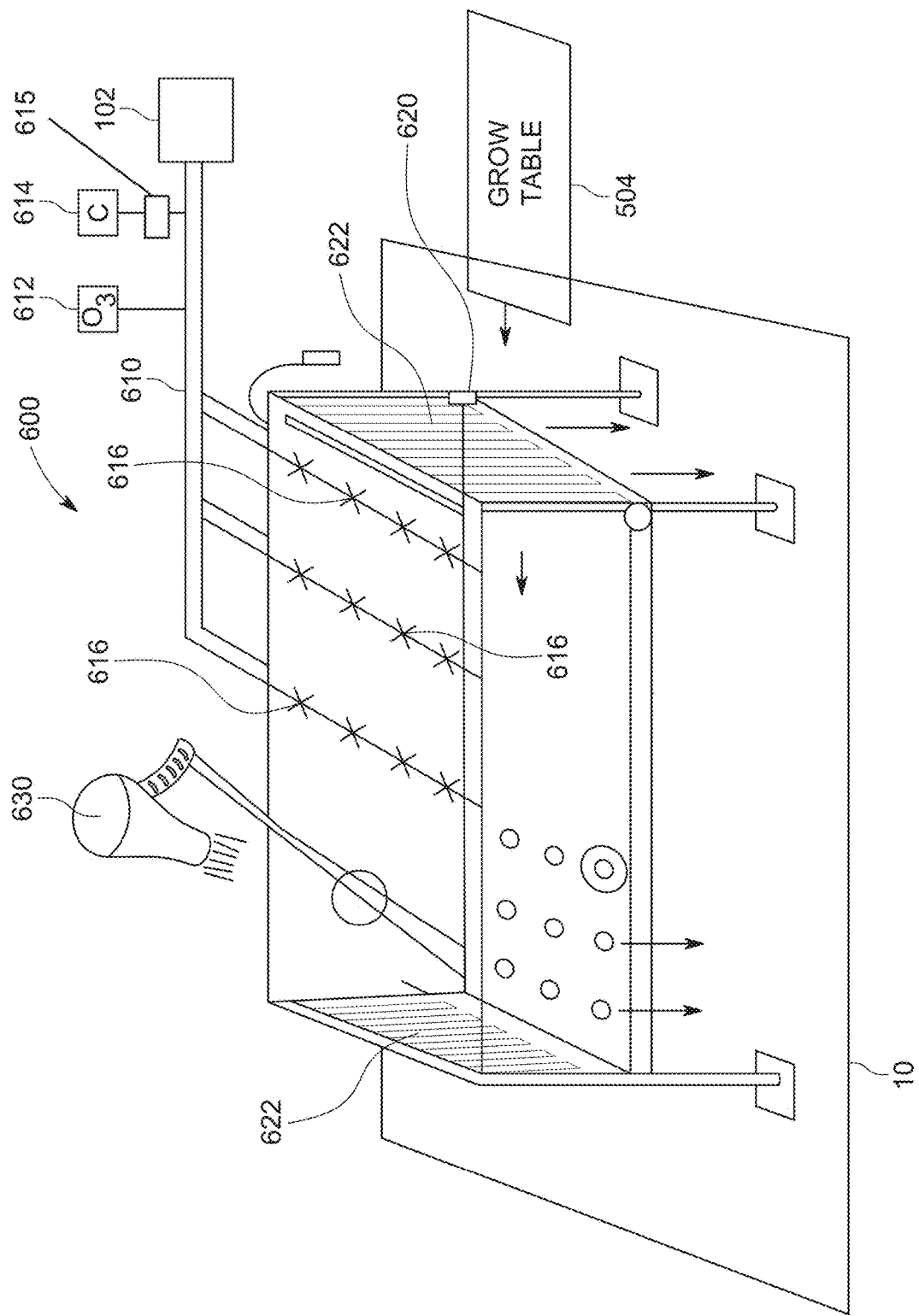
FIG. 13 illustrates a view of the cleaning system with a grow table ready to enter.

Referring to FIG. 12 a perspective view of the grow table 504 of the collection system 10 is shown with plants 7 removed (or harvested). In this view, the plant watering towers 502 are shown with drip watering tubes 506 dangling. In this view, the grow table 504 is ready to be slid from the grow area into the cleaning system 600.

Referring to FIG. 13, a perspective view of the cleaning system 600 is shown. In some embodiments. An on/off switch 620 is mounted to the cleaning system 600 for starting/stopping the cleaning process.

The roller table 510 is not shown in this view for clarity and brevity reasons. In this view, the grow table 504 is shown positioned ready to be slide into the cleaning system 600. In some embodiment, to reduce spray, strip curtains 622 are provided at each end of the cleaning system 600. In such, to affect cleaning of the grow table 504, the grow table is slid through the strip curtain 622, passing beneath nozzles 616 that emit a spray of fluids that delivered in pipes 610 from the pump 102 (see above). In some embodiments, a cleaning material 614 is mixed with the fluids, typically by a device 615, from the pump 102 before the fluids exit from the nozzles 616 to clean the grow table 504. In some embodiments, ozone 612 is mixed with the fluids from the pump 102 before the fluids exit from the nozzles 616 to clean the grow table 504.

In some embodiments, a blower 630 is positioned to blow air onto the grow table 504 as the grow table 504 exits the cleaning system 600 for removal of excess fluids that optionally include cleaning materials 614 and/or ozone 612.

As the fluids that optionally include cleaning materials 614 and/or ozone 612 fall, the fluids that optionally include cleaning materials 614 and/or ozone 612 are collected and cleaned/filtered as above by another collection system 10 as discussed above.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A cleaning system, the cleaning system comprising:
a planar material beneath a grow table that is to be cleaned, the planar material being a non-porous material except for a drain;
a plate layer comprising at least two layers of runners arranged in a grid, the grid of each successive layer of the at least two layers is offset at an angle with respect to the grid of a previous layer of the at least two layers;
the plate layer resting upon the non-porous material;
an upper layer covering the plate layer, the upper layer having a plurality of holes;
a roller table for slideably supporting a grow table thereon;
a plurality of nozzles positioned over the grow table, each nozzle of the plurality of nozzles is interfaced to a pump for receiving and spraying a liquid from the pump downwardly towards the grow table when the grow table is within the cleaning system; and
wherein, the liquid and impurities fall to the upper layer and through the plurality of holes for cleaning and filtering the liquid before the liquid is returned to the pump.

2. The cleaning system of claim 1, further comprising strip curtains at an entrance to the cleaning system for reducing spray of the liquid from exiting the cleaning system.

3. The cleaning system of claim 1, further comprising a device for adding ozone to the liquid before the liquid exits the nozzles.

4. The cleaning system of claim 1, further comprising a blower, the blower emitting air towards the grow table when the grow table is within the cleaning system, the air removing at least some of the liquid from the grow table.

5. A method of cleaning a grow table, the method comprising:
transporting the grow table into a cleaning system;
within the cleaning system, spraying the grow table with a liquid;
collecting runoff of the liquid by a mat, the mat positioned beneath the grow table in the cleaning system, the liquid passing through holes in an upper layer of the mat, thereby filtering out particles from the liquid;
after entering the holes, the liquid traversing a plate layer of the mat before reaching a drain in a lower layer of the mat, the lower layer being non-porous except for the drain, the plate layer comprising layers of runners arranged in a grid, the grid of each successive layer of the layers is offset at an angle with respect to the grid of a previous layer of the layers, thereby the liquid traversing the layers of the plate layer must traverse the grid such that oils and debris that are suspended in the liquid will accumulate within the grid;
flowing the liquid into a separation tank; and
removing the liquid from an upper area of the separation tank and into a holding tank, allowing sedimentation of heavier contaminants from the liquid to settle within the separation tank for later removal; and using the liquid from the holding tank to clean the grow table.

6. The method of claim 5, wherein the plate layer is made from textured geo-membranes made by co-extruding textured, high-density polyethylene.

7. The method of claim 5, further comprising:
injecting ozone into the holding tank for killing microorganisms.

8. The method of claim 5, further comprising:
exposing the liquid to ultraviolet light for killing microorganisms.

9. The method of claim 5, further comprising:
adding ozone to the liquid before spraying the grow table with the liquid.

10. A cleaning system for cleaning a grow table, the cleaning system comprising:
a series of nozzles, the nozzles aimed downward toward the grow table for cleaning debris from the grow table with a spray of a liquid;
a mat for capturing the liquid, the mat positioned beneath the grow table within the cleaning system, the mat having a lower layer that is substantially non-porous except for a drain, a plate layer comprising at least two layers of runners arranged in a grid, the grid of each successive layer is offset at an angle with respect to the grid of a previous layer; and an upper layer covering the plate layer, the upper layer having a plurality of holes for passage of the liquid;
a liquid processing system interfaced to the drain, the liquid processing system cleans and sanitizes the liquid; and
means for returning the liquid from the liquid processing system back to the nozzles.

11. The cleaning system of claim 10, further comprising a separation tank that receives the liquid and contaminants from the drain, the separation tank collects the contaminants that have a higher density than the liquid through settling within the separation tank.

12. The cleaning system of claim 10, further comprising means for killing microbes present in the liquid.

13. The cleaning system of claim 10, further comprising a roller table positioned beneath the grow table, the roller table for enabling sliding of the grow table in and out of the cleaning system.

14. The cleaning system of claim 10, further comprising strip curtains at an entrance to the cleaning system for reducing spray from exiting the cleaning system.

15. The cleaning system of claim 10, further comprising a device for adding ozone to the liquid before the liquid exits the nozzles.

16. The cleaning system of claim 10, further comprising a blower, the blower emitting air towards the grow table when the grow table is within the cleaning system, the air removing at least some of the liquid from the grow table.

* * * * *